Nov. 8, 1938.　　　B. A. SWENNES　　　2,136,063
SELF-ENERGIZING CLUTCH
Filed June 8, 1936　　　2 Sheets-Sheet 2
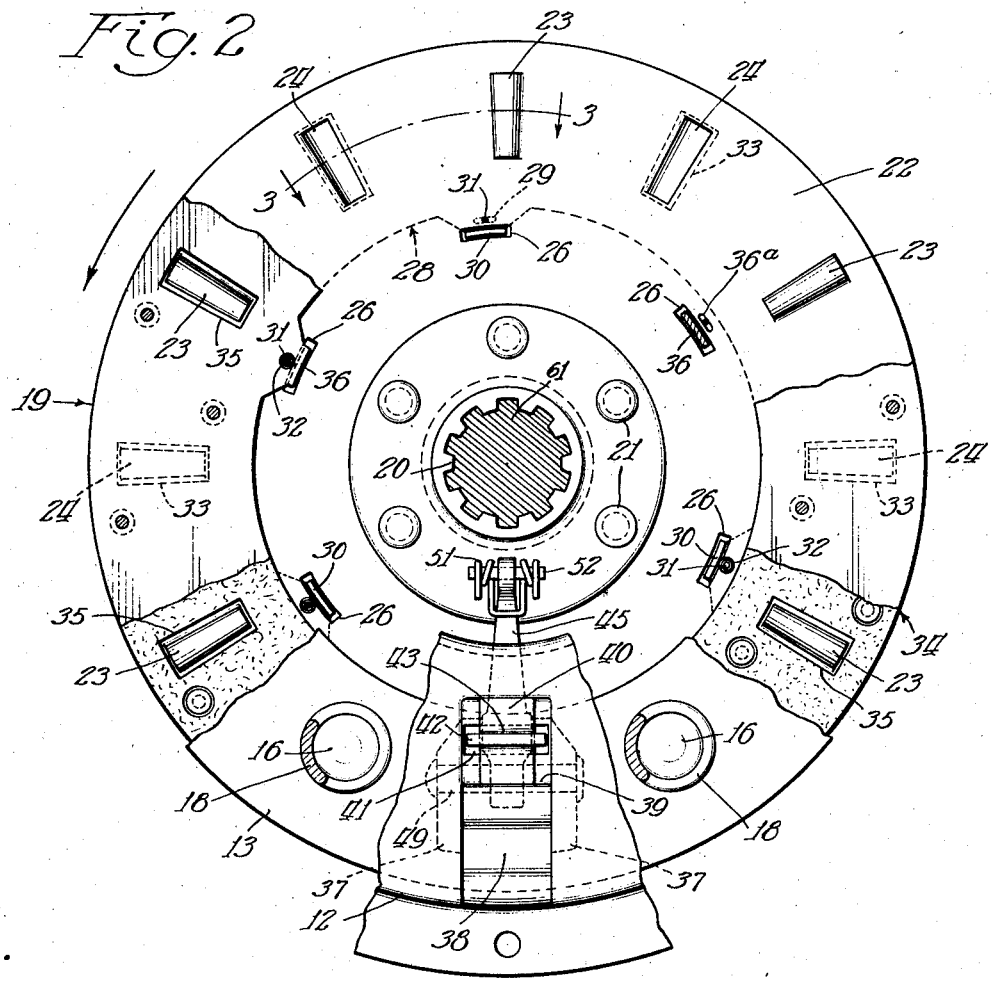
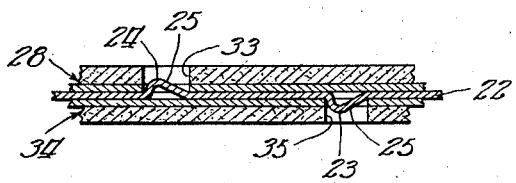
Inventor:
Benjamin A. Swennes.
By: Edward C. Fitzhugh
Atty.

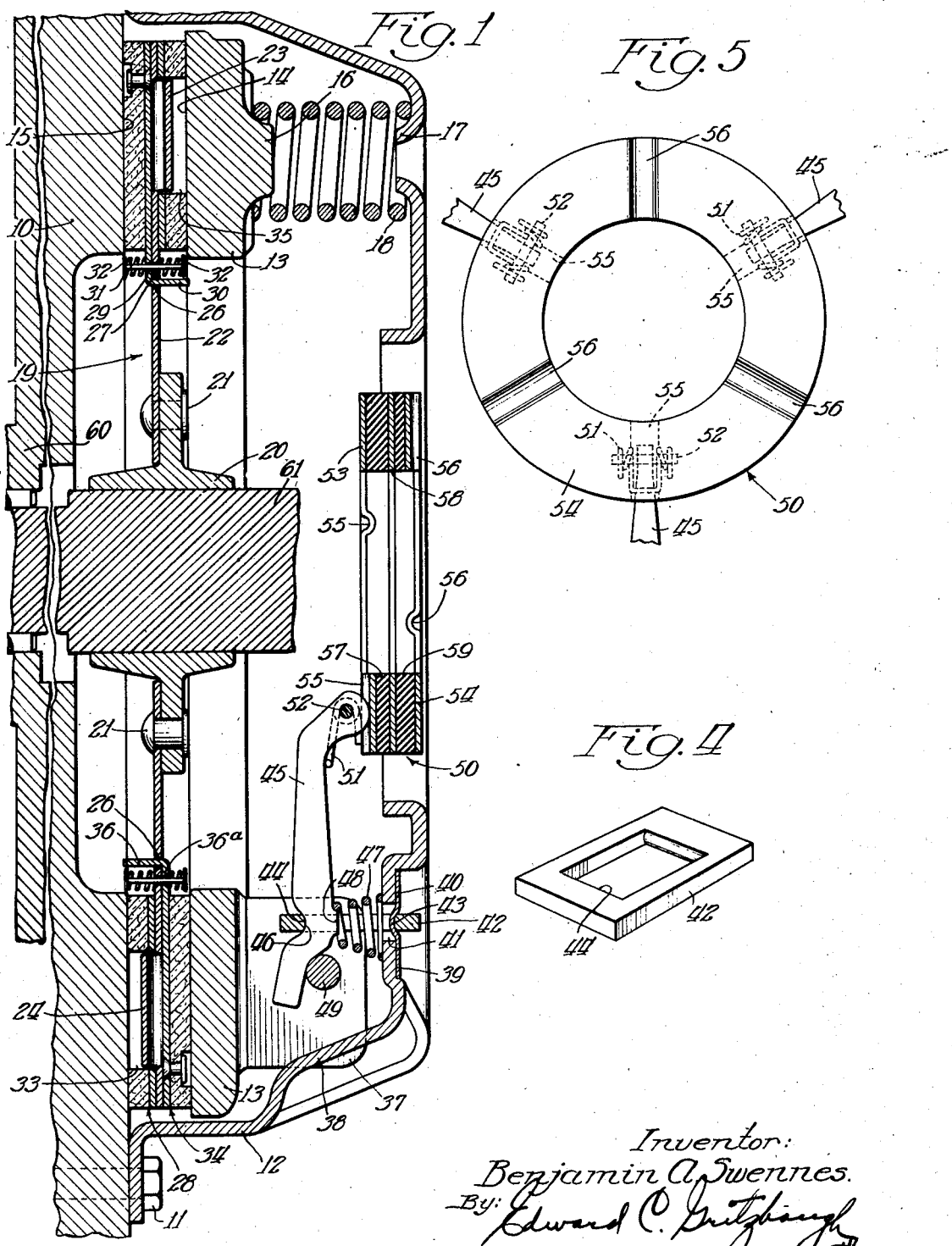

Patented Nov. 8, 1938

2,136,063

UNITED STATES PATENT OFFICE 2,136,063

SELF-ENERGIZING CLUTCH

Benjamin A. Swennes, Rockford, Ill., assignor to Borg-Warner Corporation, Chicago, Ill., a corporation of Illinois Application June 8, 1936, Serial No. 84,081

10 Claims. (Cl. 192—54)

This invention has to do with a clutch, and relates particularly to an improved clutch structure wherein the torque capacity is increased incident to a slight slippage of the clutch under load.

The ordinary friction clutch as used today upon motor vehicles between the vehicle engine and the change speed gear box is normally held engaged by expansible coiled springs. When the operator of the vehicle wishes to release the clutch he may do so by depressing a clutch pedal in the driver's compartment of the vehicle thereby moving one of the clutch friction elements out of engagement with the other against the force of such springs. While it is desirable that the springs holding the clutch engaged are not so strong as to make clutch operation difficult, it is essential that the springs have sufficient strength to prevent slippage between the clutch friction elements. In conventional manually operated clutches, ease of operation may be had only by sacrificing torque capacity or by increasing the mechanical leverage of the operating pedal. The latter is undesirable because of causing excessive movement of said pedal.

An object of the present invention is to provide an improved clutch structure employing a comparatively light spring pressure for normally holding the clutch engaged, and in which such spring pressure is automatically increased upon the occurrence of a slight slippage between the driving and driven clutch parts. That is, the present invention relates to a clutch whose driving and driven parts are frictionally engaged at one pressure during normal driving of the vehicle, and at an increased pressure during such time as greater driving torque is required.

A specific object of the present invention is the provision of a clutch power transmitting member having thereon a friction facing element, such facing element being rotatably disposed with respect to the power transmitting member and being deflectable therefrom coincidental with such rotation.

Another object of the present invention is the provision of an improved simplified clutch throw-out finger mounting.

Still another object of the present invention is the provision of a novel pressure block adapted to transmit pressure equally to a plurality of clutch throw-out fingers.

With the above and other desirable objects in view, a thorough understanding of the invention will be had upon reading the following description in combination with the accompanying two sheets of drawings hereby made a part of the specification, and wherein:

Fig. 1 is a transverse sectional view taken centrally through a clutch embodying the present invention;

Fig. 2 is a rear end view of the clutch shown in Fig. 1, parts being broken away for clarity;

Fig. 3 is a fragmentary view taken on the line 3—3 of Fig. 2;

Fig. 4 is a perspective view of a link employed in the throw-out finger mounting of the clutch shown in Fig. 1; and Fig. 5 is an end view of a pressure block employed in the present clutch structure.

Like characters of reference are used for designating the same parts shown throughout the various views of the drawings and hereinafter described.

In Fig. 1 there is shown a fly-wheel 10 secured in any standard fashion to the crank shaft 60 of a motor vehicle engine. Bolts 11, of which one is shown in Fig. 1, are used for securing a clutch cover 12 to the fly-wheel 10.

Within the clutch cover 12 is a clutch pressure plate or ring 13 having a friction surface 14 disposed in opposed relation to the back of the fly-wheel 10, the back of said fly-wheel having a friction surface designated 15. The back of the annular pressure plate 13 has thereon six lugs 16 equi-distantly about the clutch axis. Lugs 16 are in axial alignment with bosses 17 punched in the clutch cover member 12. The lugs 16 and bosses 17 serve as holding means for six compression springs 18 disposed therebetween, as shown in Fig. 1. Obviously, the number of springs 18 and holding means 16 and 17 may be changed as desired.

A clutch driven element 19 comprises a hub 20 which is splined for non-rotative connection with a driven shaft 61. Secured to the hub 20 by means of a plurality of rivets 21 is a disc 22. A series of camming lugs 23 and 24 may be punched within the body of the disc 22 near its edge, and in Figs. 2 and 3 it will be noted that the lugs 23 are pressed rearwardly of the disc 22, whereas the lugs 24 are pressed forwardly thereof. Said lugs 23 and 24 are arranged alternately about the disc, and each has a camming surface 25. In addition to the lugs 23 and 24, the disc 22 also has therein a series of apertures 26 and 27 of which the apertures 26 are elongated and arcuate as may be seen in Fig. 2.

Upon the front face of the disc 22 is a friction facing element 28. The element 28 has a plurality of arcuate apertures 29 and a like number of lugs 30 projecting into the arcuate apertures 26 of the plate 22. The apertures 27 of the disc 22 have pins 31 disposed therein, and the apertures 29 which are in registry with alternate apertures 27 therefore receive pins 31. The pins 31 extend upon both sides of the plate 22, and each end of the pins 31 has a head which forms an abutment for a small compression spring 32. Springs 32 constantly urge the friction facing element and the disc 22 laterally together. Limited rotative movement of the friction element 28 upon the disc 22 is permitted because of the apertures 26 and 29 having greater dimensions circumferentially of the clutch than the lugs 30 and pins 31, respectively.

The clutch friction facing element 28 has a number of openings or slots 33 corresponding in number to that of the cam lugs 24 projecting forwardly from the disc 22. The slots 33 register with and receive the cam lugs 24 in the manner shown in Figs. 2 and 3.

A clutch friction facing element 34 similar in structure to the element 28 is upon the back of the disc 22. The element 34 has therein slots 35 for receiving the cam lugs 23 similarly to the manner in which the slots 33 in the element 28 receive the cam lugs 24. Likewise, the friction facing element 34 has a plurality of lugs 36 disposed in a portion of the elongated apertures 26 of disc 22 and for limiting the rotative movement of the element 34 upon said disc. The friction facing element 34 is constantly urged toward and against the disc 22 by means of springs 32 which are disposed about the pins 31 passing through the element 34 and the disc 22 as illustrated in Fig. 1. Apertures 36a in element 34 correspond to apertures 29 in element 28.

The springs 18 constantly urge the pressure ring 13 forwardly, and thus normally compress the friction elements 28 and 34 between the friction surfaces 15 and 14. Means will now be described for releasing the friction parts of the clutch against the force exerted by springs 18. Three sets of paired lugs 37, spaced equidistantly about the pressure ring 13 extend rearwardly therefrom. In Figs. 1 and 2 it will be noticed that rotation of the pressure ring 13 relatively to the clutch cover 12 is precluded by the depressed section 38 which may be formed in the cover 12 at the time of its stamping into shape. The depressed section 38 are strap-like in structure and project into the respective spaces between the lugs 37 of each set. Adjacent to the depressed sections 38 are seats 39 for receiving bridges 40 which extend across apertures 41 in such seats. The bridges 40, however, are not as wide as the apertures 41 so that upon each side of the bridges 40 there is ample room for the leg of a link 42 disposed within each aperture 41; see Figs. 2 and 4. Each link 42 has one of its ends resting in a saddle 43 provided by its cooperative bridge 40. The opposite ends of the links 42 provide fulcrums 44 for clutch throw-out fingers 45. Said clutch throw-out fingers 45 are notched at 46 to prevent axial movement thereof upon their fulcrums 44. Coiled compression springs 47 are disposed within the windows of the links 42 and bear between the clutch cover 12 and a side of clutch throw-out fingers 45. Lugs 48 may be provided upon the clutch throw-out fingers to prevent the springs 47 from slipping out of place. Outer end sections of clutch throw-out fingers 45 bear against pins 49 anchored in each set of lugs 37 while the radially inwardly disposed ends of said throw-out fingers bear against a pressure block 50.

The pressure block 50 is an annulus, and the central opening therein adapts it to accommodate the clutch driven shaft 61 splined to the hub 20 of the clutch driven member 19. Said block 50 is movable axially of the clutch by means of a linkage (not shown) extending therebetween and a foot pedal conventionally in the driver's compartment of a vehicle. Rattling between the clutch throw-out fingers 45 and the pressure block 50 is precluded by coiled springs 51 wrapped about pins 52 extending transversely through the ends of throw-out fingers 45, the central section of the coiled springs 51 bearing against the throw-out fingers while the end sections of the springs bear reactively against the pressure block.

A flat annular ring 53 of steel or other relatively hard material is upon one side of block 50 and a similar ring 54 is upon the opposite side. Said rings 53 and 54 have radially disposed grooves 55 and 56 therein. The grooves 55 and 56 of each set are equally spaced and the grooves 56 are arranged so that they will coincide with the spaces between the grooves 55. Grooves 55 receive and have a line or a point contact with the inner ends of clutch throw-out fingers 45. Grooves 56 in the opposite side of the pressure block 50 make similar contact with projections upon a member (not shown) movable axially forwardly of the clutch by manipulation of said foot pedal in the driver's compartment of the vehicle. Between the rings 53 and 54 are laminations 57, 58 and 59 respectively of compressible resilient material, comparatively non-compressible material and compressible resilient material.

When the inner ends of clutch throw-out fingers 45 are moved forwardly by means of force transmitted through the pressure block 50 when the latter is moved forwardly, said throw-out fingers will be pivoted upon their fulcrums 44 whereby pins 49 and the pressure ring 13 will be retracted from the clutch driven element 19. The composite structure of the clutch pressure block 50 is provided so that said block will be distortable and thus capable of applying equal pressure upon all of the clutch throw-out fingers 45 though some of said fingers may be fortuitously adjusted differently than others.

Hereinabove it has been stated that one of the objects of the present invention is to provide a clutch in which the springs 18 may be made extremely light so that the manual operation of the clutch for its release will be possible with but slight physical exertion. The springs 18 are designed to possess strength adequate to prevent slippage between the driving and the driven clutch parts while said clutch is transmitting a light load torque. When torque in excess of that for which the springs 18 are designed is transmitted to the clutch, the clutch facing elements 28 and 34 will be rotated (with the prime mover, the flywheel 10 and the pressure ring 13) slightly clockwise relatively to the clutch disc 22, reference being taken from the front of the device. During this slight rotative movement of the facing elements 28 and 34 relatively to the clutch disc 22 the edges of the openings therein receiving the cam lugs 23 and 24 will be cammed upon the camming surfaces 25 whereby the elements 28 and 34 are spread laterally of the disc 22 against the urge of the springs 32 and the springs 18. Movement of the openings in the elements 28 and 34 completely out of registry with the cam lugs 23 and 24 is precluded by the fingers 30 and 36 abutting with the ends of their respective apertures 26. Spreading of the friction elements 28 and 34 will force the pressure ring 13 rearwardly of the device, thereby further compressing the springs 18 and resulting in greater force being applied between the friction surfaces 14 and 15 and the friction elements 34 and 28 with which they respectively engage. Sliding occurs between the elements 28 and 34 and the disc 22 instead of between such elements and the friction faces 14 and 15 of the pressure ring 13 and the flywheel 10 because the coefficient of friction between the metal to metal contact of the elements and disc is less than that of the metal to friction material contact between such elements and the friction faces 14 and 15. Inasmuch as the operator seldom, if ever, desires to release the clutch while torque is being delivered therethrough, the increase of pressure of the springs 18 during this interval of time will not vitiate the objectives of the invention. In other words, the device provides for the pressure imposed by springs 18 being greater at those times when additional torque is required and for the pressure being less at such time when the operator wishes to release the clutch.

Attention is again directed to the clutch mounting for the throw-out fingers 45. In the mass production of manufactured articles, assembly cost is an item of major importance. The mounting for clutch throw-out fingers 45 has been designed so that the same may be assembled with a minimum amount of time and labor. Assembly of the mounting is had by first thrusting the link 42 in the aperture 41, and then placing the bridge 40 across the aperture 41 and through the opening of the link 42. Next, a throw-out finger 45 is placed upon the fulcrum 44 of the link 42 in the manner illustrated in Fig. 1, and then the spring 47 is snapped in place, the spring then serving to hold the entire assembly in position. The assembly is particularly expedited inasmuch as the use of tools is unecessary.

I claim:

1. In a clutch for coupling driving and driven shafts, a disk splined to said driven shaft and having cam lugs projecting laterally therefrom, a friction facing element rotatable on said disk and having recesses adapted to receive said lugs, and said lugs camming against the sides of said recesses to cause lateral separation of said disk and said friction facing element incident to such rotation.

2. In a clutch for coupling driving and driven shafts, a disk splined to said driven shaft and having cam lugs projecting laterally therefrom and an apertured friction facing element relatively rotatable on said disk, said element having recesses receiving said lugs and also having a part projecting into said aperture to limit the relative rotation of said disk and said element, and said lugs being adapted to cam against the sides of said recesses to cause lateral separation of said disk and said element incident to such rotation.

3. In a clutch for coupling driving and driven shafts, a disk splined to said driven shaft, a friction facing element relatively rotatably on said disk, means limiting the relative rotation of said disk and said element, and interlocking cam means on said disk and said element, said cam means being operative to cause lateral movement between said disk and said element upon their relative rotation.

4. Clutch structure as set out in claim 3, and wherein there is means yieldingly resisting such lateral movement between the disk and element.

5. In a clutch for coupling driving and driven shafts, a disk splined to said driven shaft, a friction facing element relatively rotatable on said disk, interlocking slot and finger means on said disk and element limiting their relative rotation, and interlocking cam means on said disk and element, said cam means being operative to cause lateral movement between said disk and said element upon their relative rotation.

6. Clutch structure as set out in claim 5 and wherein there is means yieldingly resisting such lateral movement between said disk and said element.

7. In a clutch for coupling driving and driven shafts, a disk splined to said driven shaft, bosses on said disk, a second disk mounted on said first mentioned disk and adapted to reciprocate angularly with respect thereto, said second disk having apertures in alignment with the bosses on the first mentioned disk which cause the angular reciprocations to be translated into axial reciprocations, and resilient means on the driving member tending to compress said disks, the compressive force of said resilient means being augmented by the axial reciprocations of said second disk.

8. In a clutch for coupling driving and driven shafts, a disk splined to said driven shaft, cam surfaces embossed on said disk, an apertured annulus mounted on each side of said disk, said apertures being in line with the cam surfaces and said annuli being adapted to reciprocate angularly with respect to said disk, spaced members mounted to rotate with said driving shaft and having opposed friction surfaces, and resilient means for compressing said surfaces against said annuli, excessive force on said driving friction surfaces causing the driven disk to reciprocate relative to the driving surfaces, thereby causing the cam surfaces to cooperate with the edges of the apertures aligned therewith to translate the angular reciprocations into axial reciprocations which augment the compressive force of the resilient means.

9. In a clutch, spaced driving friction members, a driven disk included between said friction members, apertured annuli mounted on each side of said driven disk and adapted to rotate therewith, means permitting angular reciprocation between the annuli and the disk, cam means embossed in said disk and cooperating with the edges of the apertures in the annuli to translate such angular reciprocations into axial reciprocations, and resilient means tending to compress said annuli and disk between the driving friction members, whereby excessive torque tending to cause slippage between the driving members and driven disk will cause the annuli to reciprocate against action of the resilient means to augment the compressive force of said resilient means.

10. In a clutch, apparatus as described in claim 9, and friction facings secured to the outer surfaces of said annuli, said facings having a greater coefficient of friction with respect to the driving friction members than a coefficient of friction between the inner surfaces of the annuli and the driven disk, whereby to assure reciprocating motion between the said annuli and driven disk.

BENJAMIN A. SWENNES.